US012634830B2

(12) United States Patent
Park et al.

(10) Patent No.: US 12,634,830 B2
(45) Date of Patent: May 19, 2026

(54) PREDICTING BANDWIDTH AND POWER SAVINGS FOR DIFFERENT FORM FACTORS

(71) Applicant: QUALCOMM Incorporated, San Diego, CA (US)

(72) Inventors: Sunwoo Park, Yongin-si (KR); Won-Seon Choi, Seoul City (KR); Julee Park, Seoul (KR); Eunsang Hwang, Seoul (KR); Huijun Choi, Incheon (KR); Joonhee Hwang, San Jose, CA (US); Heegyum Kim, Bucheon-si (KR)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 18/513,825

(22) Filed: Nov. 20, 2023

(65) Prior Publication Data

US 2025/0168774 A1 May 22, 2025

(51) Int. Cl.
H04W 52/02 (2009.01)
H04W 76/15 (2018.01)

(52) U.S. Cl.
CPC ....... H04W 52/028 (2013.01); H04W 52/027 (2013.01); H04W 76/15 (2018.02)

(58) Field of Classification Search
CPC ............. H04W 52/028; H04W 52/027; H04W 52/0229; H04W 76/15; H04W 76/34; H04W 88/06
See application file for complete search history.

(56) References Cited

U.S. PATENT DOCUMENTS

| | | | | |
|---|---|---|---|---|
| 11,265,752 | B1 * | 3/2022 | Marupaduga | ..... H04W 36/0085 |
| 11,297,484 | B1 * | 4/2022 | Marupaduga | ......... H04W 24/02 |
| 11,917,703 | B2 * | 2/2024 | Pati | ..................... H04B 17/318 |

(Continued)

FOREIGN PATENT DOCUMENTS

| | | | |
|---|---|---|---|
| WO | WO-2014163696 | A1 | 10/2014 |
| WO | WO-2016188173 | A1 * 12/2016 | ............ H04W 24/02 |

(Continued)

OTHER PUBLICATIONS

International Search Report and Written Opinion—PCT/US2024/049224—ISA/EPO—Jan. 7, 2025.

*Primary Examiner* — Sujoy K Kundu
*Assistant Examiner* — Vladislav Y Agureyev
(74) *Attorney, Agent, or Firm* — Muncy, Geissler, Olds & Lowe, P.C.

(57) ABSTRACT

Embodiments include methods performed by a user equipment for efficient management of network resources and power consumption when using a dual channel capability. The process may include determining a maximum throughput based on connection parameters of the user equipment, receiving an indication of a change in a form factor of the user equipment, detecting an actual throughput of the user equipment within a given time window, and determining whether to enable or disable dual connect for the user equipment based on a comparison of the actual throughput with the maximum throughput. The comparisons of the actual throughput with the maximum throughput may include one or more thresholds that are set relative to the actual and maximum throughputs.

26 Claims, 10 Drawing Sheets

(56) References Cited

U.S. PATENT DOCUMENTS

| | | | | |
|---|---|---|---|---|
| 2015/0327139 | A1* | 11/2015 | Sirotkin | H04W 76/20 |
| | | | | 370/332 |
| 2018/0077623 | A1* | 3/2018 | Sirotkin | H04W 36/1443 |
| 2018/0124861 | A1* | 5/2018 | Berger | H04W 76/15 |
| 2019/0104042 | A1* | 4/2019 | Yang | H04L 43/08 |
| 2019/0141619 | A1* | 5/2019 | Dudzinski | H04W 76/10 |
| 2019/0200212 | A1* | 6/2019 | Quan | H04W 76/10 |
| 2019/0394655 | A1* | 12/2019 | Rahman | H04L 41/142 |
| 2020/0383155 | A1* | 12/2020 | Pati | H04W 76/15 |
| 2021/0014865 | A1* | 1/2021 | Zheng | H04W 76/27 |
| 2021/0377823 | A1* | 12/2021 | Lee | H04W 36/00698 |
| 2022/0078877 | A1* | 3/2022 | Lee | H04W 76/15 |
| 2022/0217042 | A1* | 7/2022 | Santhanam | H04B 7/0404 |
| 2022/0217801 | A1* | 7/2022 | Chang | H04W 76/20 |
| 2022/0264387 | A1 | 8/2022 | Kim et al. | |
| 2022/0369319 | A1* | 11/2022 | Kumar | H04W 76/15 |
| 2023/0072593 | A1* | 3/2023 | Il | H04L 47/20 |
| 2023/0118253 | A1* | 4/2023 | Murgai | H04L 41/149 |
| | | | | 370/318 |
| 2023/0129661 | A1* | 4/2023 | Kordybach | H04W 28/0967 |
| | | | | 370/229 |
| 2023/0180131 | A1* | 6/2023 | Kragten | H04W 52/0251 |
| | | | | 455/574 |
| 2023/0199543 | A1* | 6/2023 | Zhang | H04W 72/231 |
| | | | | 370/252 |
| 2023/0217329 | A1* | 7/2023 | Wallentin | H04W 36/0058 |
| | | | | 370/331 |
| 2023/0308905 | A1* | 9/2023 | Teyeb | H04L 5/0035 |
| 2023/0397271 | A1* | 12/2023 | Ashiwal | H04W 72/21 |
| 2024/0137865 | A1* | 4/2024 | Yuan | H04W 76/34 |
| 2024/0196326 | A1* | 6/2024 | Dange | H04W 52/0258 |
| 2024/0298370 | A1* | 9/2024 | Freda | H04W 40/22 |
| 2025/0365214 | A1* | 11/2025 | Zhang | H04L 41/16 |

FOREIGN PATENT DOCUMENTS

| | | | | | |
|---|---|---|---|---|---|
| WO | WO-2021036891 | A1 * | 3/2021 | | H04W 76/11 |
| WO | WO-2022220424 | A1 * | 10/2022 | | H04W 72/02 |
| WO | WO-2022235187 | A1 * | 11/2022 | | H04W 24/10 |
| WO | WO-2023020852 | A1 * | 2/2023 | | H04B 7/06964 |
| WO | WO-2023063802 | A1 * | 4/2023 | | H04W 52/0258 |
| WO | WO-2024128407 | A1 * | 6/2024 | | H04W 8/24 |

* cited by examiner

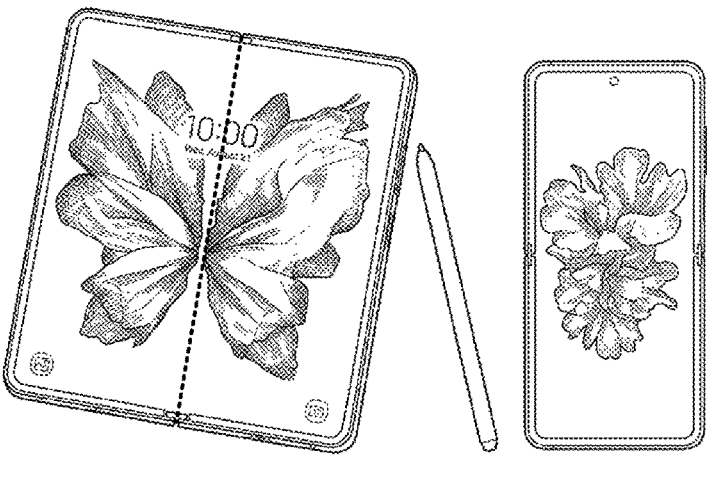
UE Unfolded 210  UE Folded 212
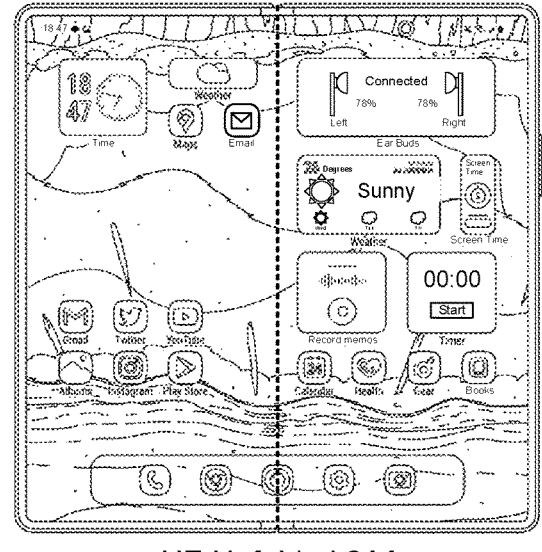
UE Unfolded 214
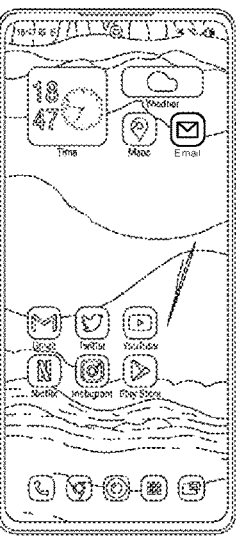
UE Folded 216
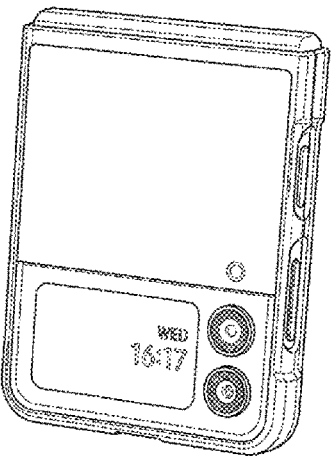
UE
Folded
218
FIG. 2

300

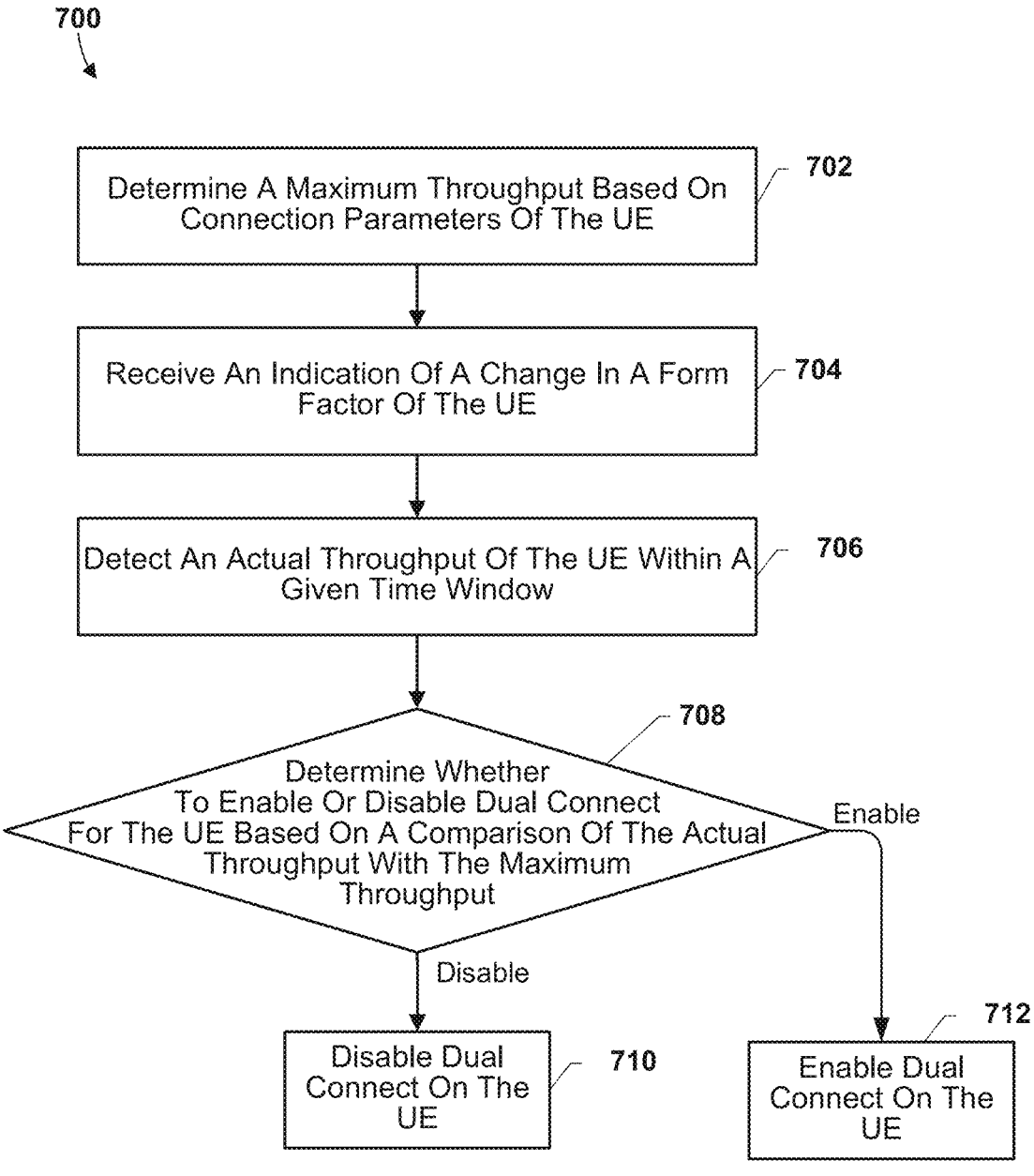

700

Determine A Maximum Throughput Based On Connection Parameters Of The UE — 702

Receive An Indication Of A Change In A Form Factor Of The UE — 704

Detect An Actual Throughput Of The UE Within A Given Time Window — 706

Determine Whether To Enable Or Disable Dual Connect For The UE Based On A Comparison Of The Actual Throughput With The Maximum Throughput — 708

Enable

Disable

Disable Dual Connect On The UE — 710

Enable Dual Connect On The UE — 712

FIG. 7

PREDICTING BANDWIDTH AND POWER SAVINGS FOR DIFFERENT FORM FACTORS

BACKGROUND

Long Term Evolution (LTE), Fifth Generation (5G) New Radio (NR), and other communication technologies enable improved communication and data services. As a part of these new communication capabilities, many devices are enabled to connect via two or more channels at a time and may connect via two or more subscriber identity module (SIM) cards at a time. Using multiple channels at the same time is power intensive and not always necessary. Predicting periods of device use when reduced bandwidth is likely can enable reduction of power usage and enable better network efficiency.

SUMMARY

Various aspects include systems and methods performed by a processor of a wearable device for managing connectivity of a wireless device for energy savings. Various aspects may include power management and bandwidth management of a user equipment, including determining a maximum throughput based on connection parameters of the user equipment, receiving an indication of a change in a form factor of the user equipment, detecting an actual throughput of the user equipment within a given time window, and determining whether to enable or disable dual connect for the user equipment based on a comparison of the actual throughput with the maximum throughput.

In some aspects, the change in the form factor is a deactivation of a sub-screen of the user equipment. In some aspects, a form factor change of folding a tablet into a pocket-sized form factor may be sensed by a sensor that detects a screen position and indicated to the user equipment, in which the folding deactivates or hides a portion of the screen of the tablet. In some aspects, in a closed form factor, a main screen of a user equipment may be deactivated and only a notification screen may be active. A form factor change or screen deactivation may indicate a reduction in bandwidth needs.

In some aspects, detection of the actual throughput may include detecting a data throughput in a packet data convergence protocol (PDCP) layer within the given time window and the actual throughput may be an average of the data usage of the user equipment within the given time window. In some aspects, the determining may result in disabling dual connect if actual throughput is less than a first threshold and less than the maximum throughput, and disabling dual connect may include dropping a secondary cell group (SCG) associated with the user equipment.

Some aspects may further include comparing the actual throughput with a first threshold that is less than the maximum throughput, comparing the actual throughput with a second threshold that is less than the first threshold, adding a secondary cell group via dual connect if the actual throughput is greater than the first threshold, and dropping a secondary cell group via dual connect if the actual throughput is less than the second threshold.

Further aspects include a user equipment (UE) having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a user device to perform operations of any of the methods summarized above. Further aspects include a computing device having means for performing functions of any of the methods summarized above. Further aspects include a system on chip for use in a computing device that includes a processor configured to perform operations of any of the methods summarized above.

BRIEF DESCRIPTION OF THE DRAWINGS

FIG. 2 illustrates various form factors of various UEs according to various aspects herein.

FIG. 7 is a process diagram illustrating a method suitable for implementing various aspects herein.

DETAILED DESCRIPTION

Figure 1A:
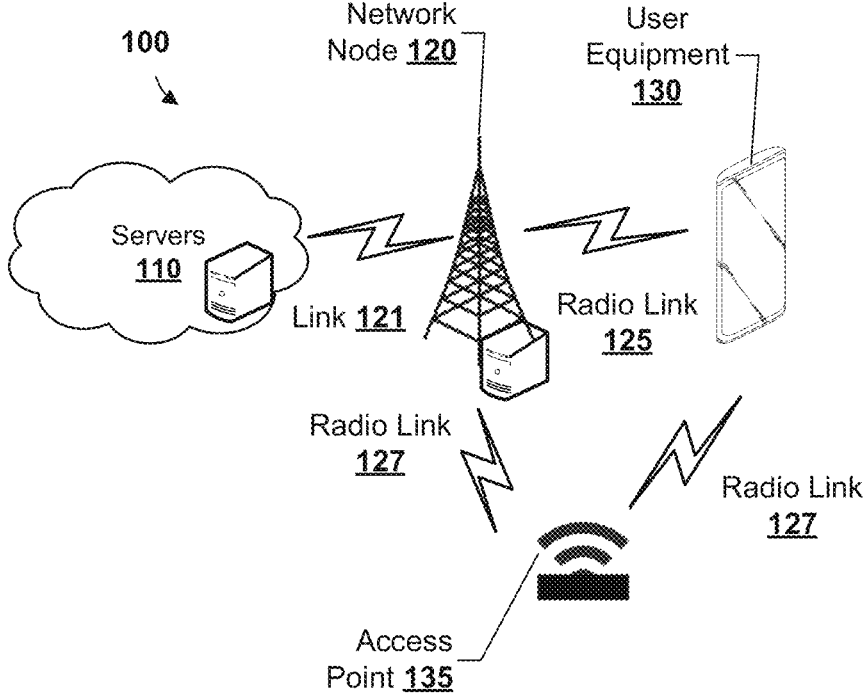
FIG. 1A is a system block diagram illustrating an example communications system suitable for implementing any of the various aspects herein.

Various embodiments and implementations will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include systems and methods for monitoring bandwidth usage and form factor changes on a user equipment (UE) that is capable of a form factor change (e.g., a folding display, multiple displays, etc.) in order to manage connections of the UE to save power and use network resources efficiently. Various embodiments also include methods that may be implemented in a user device or UE that is configured to receive an indication of a change in a form factor of the user equipment, determine a maximum throughput based on connection parameters of the user equipment, detect an actual throughput of the user equipment within a given time window, and determine whether to enable or disable dual connect for the user equipment based on a comparison of the actual throughput with the maximum throughput.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, virtual reality displays, extended reality displays, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

Some UEs may include telecommunication modems that include antenna(s), tuner(s), and other hardware components in order to connect and maintain dual connections to a cellular network. These dual connections (Dual Connectivity-DC) effectively or substantially double the bandwidth (e.g., throughput) available to the UE. Of course, a doubled bandwidth (e.g., two slots) for the UE utilizes at least twice as many radio resources (e.g., connection slots) even if the dual connections are at different frequencies or connect to different network nodes. Therefore, it is advantageous to monitor use of bandwidth at the UE and predict bandwidth use so that radio resources can be allocated efficiently.

Further, recent developments in user hardware (e.g., UEs) have enabled a single device to take on a number of different form factors. For example, a tablet (e.g., with an aspect ratio of 4:3) may fold along one or more lines such that its screen takes on a different resolution and aspect ratio (e.g., 16:9). The software and applications running on the UE may also adapt to the changed resolution (e.g., changing picture sizes, font size, border widths, etc.). The UE may include sensors to detect when a form factor has changed so that applications can adapt and so that one or more portions of the screen may be deactivated or turned off.

In some aspects, a UE that is in a reduced form factor may require less bandwidth even for the same applications or uses (e.g., video) because the reduced form factor may reduce the usable resolution of the UE. A UE may also require equal or greater bandwidth in a reduced form factor, as in the case where the UE is a bridge device for an augmented reality or virtual reality device. Thus, a change in form factor may indicate that a change in a bandwidth requirement is forthcoming.

A UE or a radio modem thereof may monitor bandwidth usage and one or more sensors or flags that indicate that the UE has had a change in form factor. Based on the detected bandwidth needs, available resources, and the form factor of the device, a UE may predict its bandwidth or resource needs and adjust its connectivity configuration. For example, where bandwidth usage is lower than the capacity of a single connection's bandwidth, the UE may switch off one of the dual connections of the radio modem upon detecting that a form factor change has reduced screen resolution.

FIG. 1A is a system diagram illustrating an example communication system 100 including a network providing a communication link between a UE 130 and servers 110. The UE may connect to the servers 110 via a network node 120 that is connected to the servers 110 via link 121 (e.g., wired, fiber, wireless link). As used herein, the terms "network," "system," "wireless network," "cellular network," and "wireless communication network" may interchangeably refer to a portion or all of a wireless network of a carrier associated with a wireless device and/or subscription on a wireless device. The communication system 100 may include a number of network nodes 120 and other network entities, such as base stations and access points 135. A network node 120 is an entity that communicates with user devices and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like.

As described above, the UE 130 may include a radio modem with dual connectivity (DC) and may connect to the network via radio link 125 and radio link 127. The radio link 127 may connect to the network node 120 via access point 135, which may use the same frequencies or different frequencies than the network node 120. Where multiple upstream connection points (e.g., network node, access point, repeater) overlap in range, the connection hubs may coordinate the assignment of the limited radio resources of the area (e.g., connectivity slots). For example, the radio resource allocations of the access point 135 and the network node 120 may be coordinated so as to not interfere. The devices illustrated in FIG. 1A are merely examples and may be other computing devices or communication devices. The radio link 125 may be provided over a 5G New Radio (NR) network, or any other suitable network, such as a Long-Term Evolution (LTE) network or later generation network. Therefore, the reference to a 5G network and 5G network elements in the following descriptions is for illustrative purposes and is not intended to be limiting. The communication system 100 may be a heterogeneous network including peer-to-peer links, relay links, and one or more links to a network node (e.g., network node 120).

Further, UE 130 may connect to network node 120 via dual connections directly via radio link 125. The dual connectivity (DC) modem of the UE 130 may operate two transceivers connected to the network node 120 such that each transceiver provides an independent bandwidth resource for the UE 130. For example, each of the dual connections of the UE 130 may be independently allocated physical downlink shared channels (PDSCH) and physical uplink shared channels (PUSCH) by the network node 120. Likewise, upon a change in form factor as illustrated in FIG. 2, the UE 130 may evaluate its bandwidth needs and drop one of the connections to the network node 120. While dual connectivity is discussed here, it is contemplated that a modem or transceiver of a UE 130 may host and manage many more connections and may manage those connections in accordance with the efficiency processes disclosed herein.

Various embodiments may make use of various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement Enhanced Data rates for global system for mobile communications (GSM) Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In various communication network implementations or architectures, a network node may be implemented as an aggregated base station, as a disaggregated base station, an integrated access and backhaul (IAB) node, a relay node, a sidelink node, etc., such as a virtualized Radio Access Network (vRAN) or Open Radio Access Network (O-RAN). Also, in various communication network implementations or architectures, a network device (or network entity) may be implemented in an aggregated or monolithic base station architecture, or alternatively, in a disaggregated base station architecture, may include one or more of a Centralized Unit (CU), a Distributed Unit (DU), a Radio Unit (RU), a near-real time (RT) RAN intelligent controller (RIC), or a non-real time RIC. Each network device may provide communication coverage for a particular geographic area. In 3GPP, the term "cell" can refer to a coverage area of a network device, a network device subsystem serving this coverage area, or a combination thereof, depending on the context in which the term is used.

A network node 120 may provide communication coverage for a macro cell, a pico cell, a femto cell, another type of cell, or a combination thereof. A macro cell may cover a relatively large geographic area (for example, several kilometers in radius) and may allow unrestricted access by user devices with service subscription. A pico cell may cover a relatively small geographic area and may allow unrestricted access by user devices with service subscription. A femto cell may cover a relatively small geographic area (for example, a home) and may allow restricted access by user devices having association with the femto cell (for example, user devices in a closed subscriber group (CSG)). A network node for a macro cell may be referred to as a macro node or macro base station. A network node for a pico cell may be referred to as a pico node or a pico base station. A network node for a femto cell may be referred to as a femto node, a femto base station, a home node or home network device. The terms "network device," "network node," "eNB," "base station," "NR BS," "gNB," "TRP," "AP," "node B," "5G NB," and "cell" may be used interchangeably herein.

In some examples, a cell may not be stationary, and the geographic area of the cell may move according to the location of a network device. In some examples, the network nodes may be interconnected to one another as well as to one or more other network devices (e.g., base stations or network nodes (not illustrated)) in the communication system 100 through various types of backhaul interfaces, such as a direct physical connection, a virtual network, or a combination thereof using any suitable transport network.

The network node 120 may communicate with the backend servers 110 over a wired or wireless communication link (e.g., link 121). The UE 130 may communicate with the network node 120 over a wireless communication link 125 and over a radio link 127 via access point 135. A wired communication link for the backend (e.g., link 121) may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communication system 100 also may include relay stations that may receive a transmission of data from an upstream station (for example, a network node or a UE) and send a transmission of the data to a downstream station (for example, a UE or a network node). A relay station may be a UE that can relay transmissions for other UEs. A network controller may couple to a set of network nodes and may provide coordination and control for these network nodes. The network controller may communicate with the network nodes via a backhaul, midhaul, and/or fronthaul. The network nodes also may communicate with one another, for example, directly or indirectly via a wireless or wireline backhaul.

The communication system 100 or 160 may be a heterogeneous network that includes network devices of different types, for example, macro network devices, pico network devices, femto network devices, relay network devices, etc. These different types of network devices may have different transmit power levels, different coverage areas, and different impacts on interference in communication system 100. For example, macro nodes may have a high transmit power level (for example, 5 to 40 Watts) whereas pico network devices, femto network devices, and relay network devices may have lower transmission power levels (for example, 0.1 to 2 Watts). The bridging devices (e.g., 135) may be dispersed throughout communication system 100 and may be stationary or mobile. A bridge device 130 also may be referred to as an access terminal, a terminal, a mobile station, a subscriber unit, a user station, wireless device, etc.

The wireless communication links (e.g., radio link 125 or radio link 127) may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz).

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or components) performing base station functionality, may be implemented in an aggregated or disaggregated architecture. For example, a base station (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or as a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, DUs and RUs also can be implemented as virtual units, referred to as a virtual central unit (VCU), a virtual distributed unit (VDU), or a virtual radio unit (VRU).

Base station-type operations or network design may consider aggregation characteristics of base station functionality. For example, disaggregated base stations may be utilized in an integrated access backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
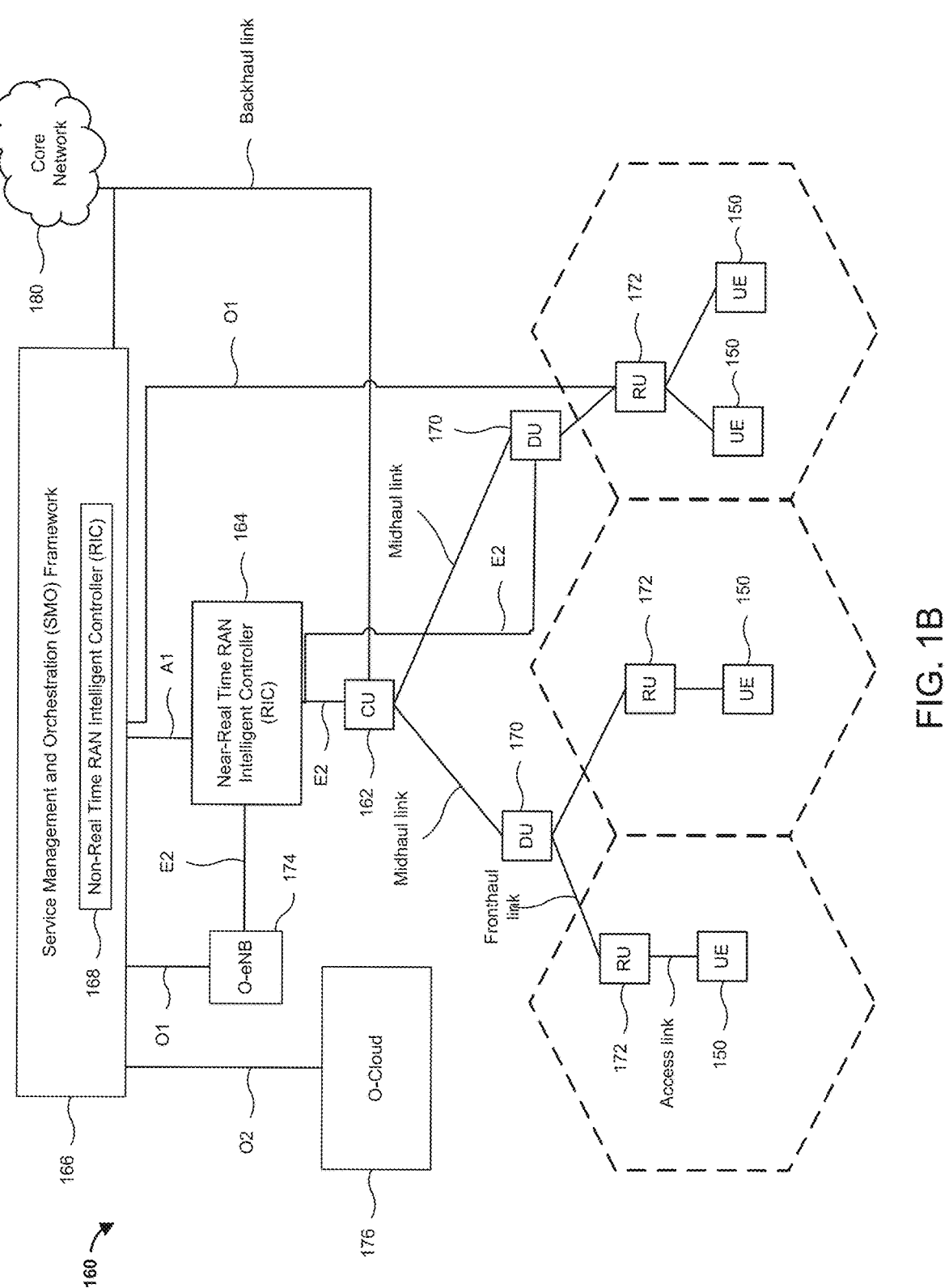
FIG. 1B is a system block diagram illustrating an example disaggregated base station architecture suitable for implementing any of the various embodiments.

FIG. 1B is a system block diagram illustrating an example disaggregated base station 160 architecture suitable for implementing any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 150 via one or more radio frequency (RF) access links. In some implementations, the UE 150 may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based RAN architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

FIG. 2 illustrates various different UEs 130 in different form factors. With reference to FIGS. 1A-2, the UE devices illustrated in FIG. 2 may include UEs with folding screen capabilities. For example, the UE unfolded 210 may be folded along the white dashed line to arrive at the form factor of UE folded. When UE unfolded 210 is folded (or otherwise repositioned) to UE folded 212, the resolution of the active portion of the screen may be cut in half. This reduction in resolution may result in a corresponding reduction in the bandwidth needed by an application operating to display information. That is, the non-pictured portion of the screen of the UE folded 212 may be deactivated or turned off.

Similarly, the UE unfolded 214 may be folded into the form factor of UE folded 216. Upon the UE unfolded 214 being folded, the right-hand side of the screen may be deactivated or turned off. Upon the UE unfolded 214 being folded, some informational content (e.g., widgets and icons) may disappear and some informational content (e.g., bottom icon tray) may be re-arranged into the new display resolution and aspect ratio. In other words, a change in form factor may often be implemented without rescaling displayed informational/graphical content and may simply clip or truncate the displayed content. Such truncation or content cropping may cause rapid reductions in the bandwidth needs of a UE. Accordingly, the UE may use form factor changes as a trigger to re-assess bandwidth needs as described below.

The UE folded 212 or UE folded 216 or the UE 130 may be folded into UE folded 218 as illustrated in FIG. 2. The UE folded 218 may only have a small informational screen still active (as shown) so that the user can receive notifications and time/date information, for example. In this case, the bandwidth reduction caused by this form factor change may be over 90% or over 95%. For example, a form factor change of folding a tablet into a pocket-sized form factor may be sensed and indicated to the user equipment. This folding deactivates and/or hides a portion of the screen of the tablet. In this example, in the closed form factor, a main screen of a user equipment may be deactivated and only a notification screen may be active.

Figure 5A:
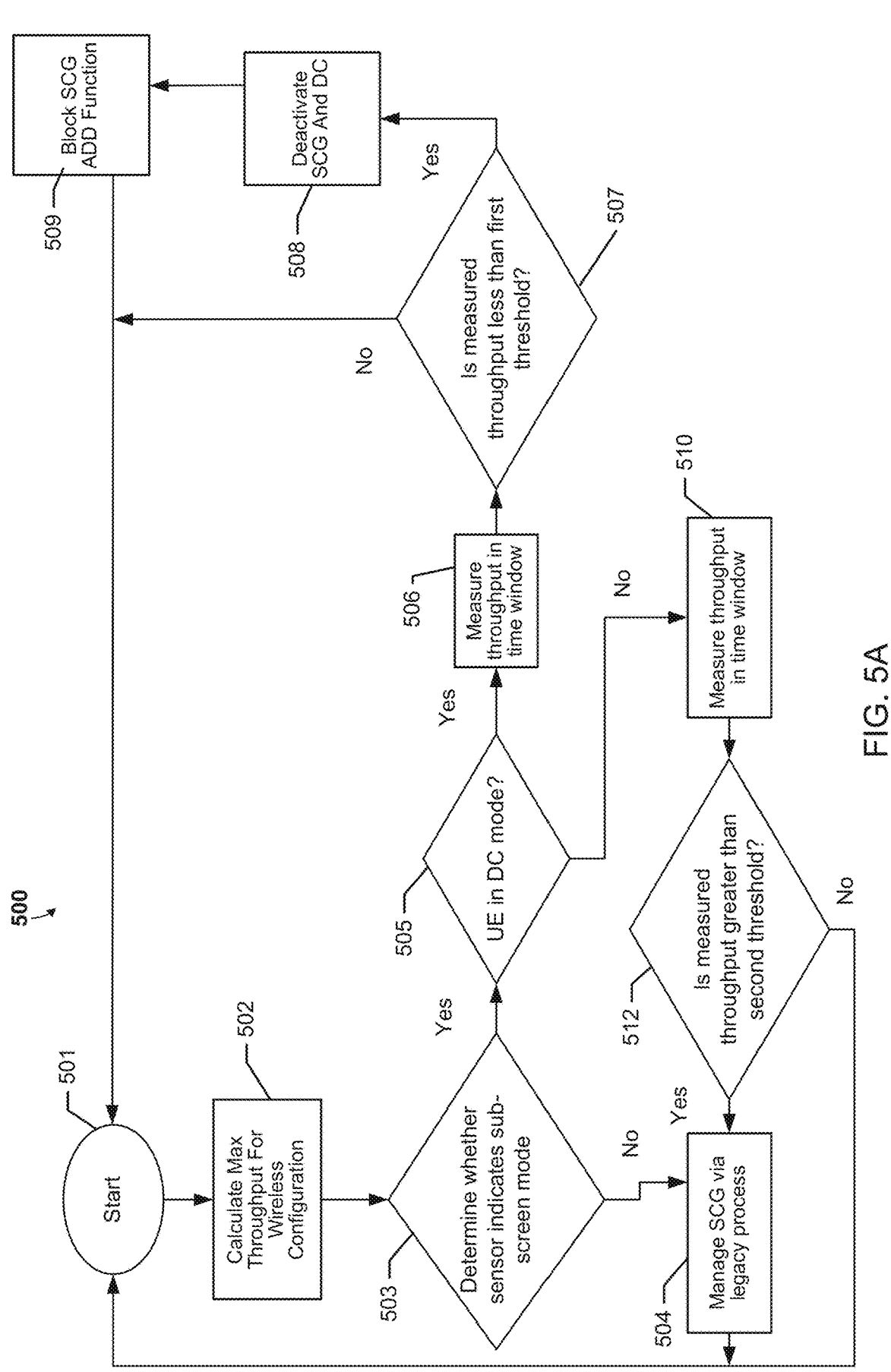
FIG. 5A is a flow diagram illustrating a decision flow suitable to implement various aspects herein.

Likewise, the switching off of any of the UE screens of FIG. 2 or a portion thereof may reduce bandwidth uses by proportional amounts. A UE in a folded position may also maintain its bandwidth requirements, when, for example, the user is primarily streaming music. Therefore, the bandwidth predictions resulting a change in form factor may balance a variety of factors as shown in FIG. 5A for example.

Figure 3:
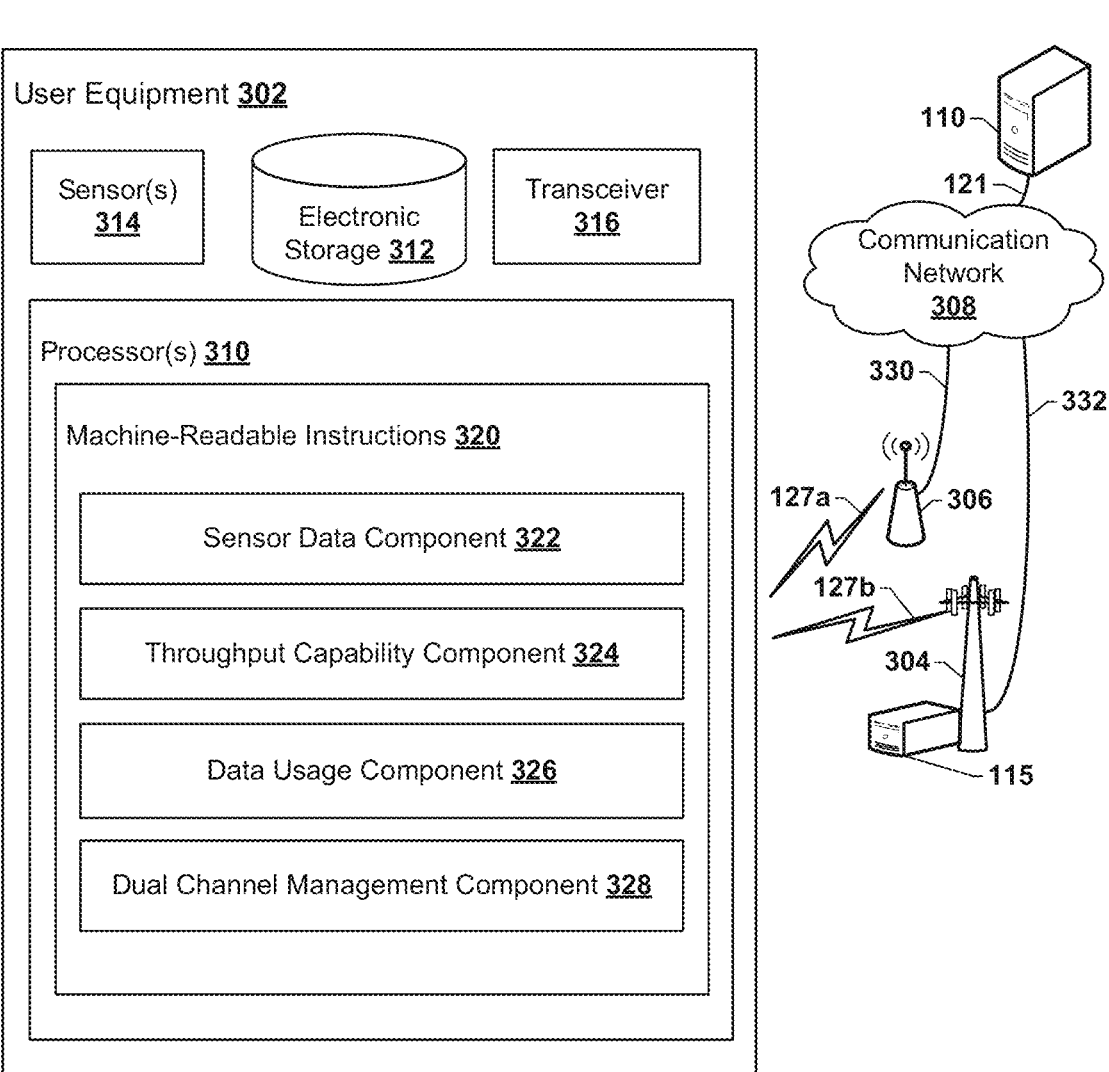
FIG. 3 is a system block diagram illustrating a component block diagram suitable to implement various aspects herein.

FIG. 3 is a component block diagram illustrating a system 300 configured to manage connections based on form factor, power usage and network constraints in accordance with various embodiments. With reference to FIGS. 1A-3, the system 300 may include a UE 302 (e.g., UE 130) configured to communicate with servers 110 via a local wireless connection (e.g., radio link 127, 125) or other near field communication (NFC) communication techniques. The UE 302 may connect to a wireless communication network 308, such as a cellular wireless communication network, via a wireless communication link 127*b* with a gNB 304, which may connect via backhaul or midhaul 332 to communication network 308. The UE 302 may also be configured to communicate directly with external resources (e.g., server 110) via a wireless communication link 127*a* to the wireless communication network 308. Wireless connection 127*a* may be a radio link to a picocell 306, which may connect via backhaul or midhaul 330 to communication network 308. Wireless connection 127*b* may be a radio link to the gNB 304, which may connect via backhaul or midhaul 332 to communication network 308. The communication network 308 may connect to a server 110 via link 121 (e.g., fiber) and an edge server 115 may be co-located with gNB 304.

The UE 302 may connect via the dual connections of wireless communications 127 a, 127*b* using transceiver 316. This dual connectivity (DC) may be managed by the processors 310 (or processor system) which execute one or more machine readable instructions 320 which provide various components of this managing process. As described above, parallel wireless communication transmitters (e.g., 304, 306) may co-manage or coordinate the radio resources of the area (and UE 302) so as to avoid interference. For example, wireless communications 127 a, 127*b* may be different PDSCH or PUSCH slots.

The UE 302 may include one or more processors 310, electronic storage 312, one or more sensor(s) 314, a transceiver 316 (e.g., wireless transceiver), and other components. The UE 302 may include communication lines, or ports to enable the exchange of information with a network and/or other computing platforms. Illustration of the UE 302 in FIG. 3 is not intended to be limiting. The UE 302 may include a plurality of hardware, software, and/or firmware components operating together to provide the functionality attributed herein to the wearable 302. The sensors 314 may include a screen position sensor or a fold detection sensor. Further, sensors 314 may include one or more software or memory-based flags that serve as indicators of parameters such as screen position, screen angle, screen activation/deactivation, closed screen covers, and other indicators of form factor changes or display changes.

Electronic storage 312 may include non-transitory storage media that electronically stores information. The electronic storage media of electronic storage 312 may include one or both of system storage that is provided integrally (i.e., substantially non-removable) with the UE 302 and/or removable storage that is removably connectable to the UE 302 via, for example, a port (e.g., a universal serial bus (USB) port, a firewire port, etc.) or a drive (e.g., a disk drive, etc.). Electronic storage 312 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 312 may include one or more virtual storage resources (e.g., cloud storage, a virtual private network, and/or other virtual storage resources). Electronic storage 312 may store software algorithms, information determined by processor(s) 310, information received from the UE 302, information received from the edge server 115, external resources (e.g., server 110), and/or other information that enables the UE 302 to function as described herein.

The processor(s) 310 may include one of more local processors (as described with reference to FIGS. 6 and 8), which may be configured to provide information processing capabilities in the UE 302 (e.g., a cell phone). As such, processor(s) 310 may include one or more of a digital processor, an analog processor, a digital circuit designed to process information, an analog circuit designed to process information, a state machine, and/or other mechanisms for electronically processing information. Although processor(s) 310 is shown in FIG. 3 as a single entity, this is for illustrative purposes only. In some embodiments, processor(s) 310 may include a plurality of processing units, one or more of which may be a processor system. These processing units may be physically located within the same device, or processor(s) 310 may represent processing functionality of a plurality of devices operating in coordination.

The UE 302 may be configured by machine-readable instructions 320, which may include one or more instruction modules. The instruction modules may include computer program components. In particular, the instruction modules may include one or more of a sensor data component 322, a throughput capability component 324, a data usage component 326, a dual channel management component 328, and/or other instruction modules. Together these components (e.g., 322-328) of UE 302 may provide system responses to changes in form factor and data usage by the UE 302 as also illustrated in FIGS. 4A, 4B, 5A, 5B.

The sensor data component 322 may connect to one or more sensors 314 to detect orientation, ranging, inertia, movement, direction, and other positional information. Ranging sensor information may come from one or more cameras, radio or sound ranging sensors, lasers, wireless signaling (e.g., Wi-Fi ranging), ultrasonic and/or other range finding systems. Imaging sensors using computer vision may detect the location and angular orientation of surfaces, as well as recognize objects. Inertial and orientation information may be detected by an inertial measurement unit (IMU) including accelerometers, gravitometers, and magnetometers. Direction, orientation, and movement may be detected by global positioning system (GPS) receivers or the like. These sensors or other specialized sensors may detect the changes in form factor of the UE 302 or detect conditions that would reduce the bandwidth requirements of a device. The data from these sensors 314 may be collected and stored on electronic storage 312 by the sensor data component 322.

As a non-limiting example, a magnetic sensor may detect that a screen cover has been secured over the screen which may indicate that the screen is no longer in use and may trigger a deactivation of the screen. The signals of the magnetic sensor and the flags indicating deactivation of the screen or non-use of the screen may be collected and stored by the sensor data component 322. These stored signals may then be read by other components (e.g., 324-328) executing on processor(s) 310 in order to manage connectivity and bandwidth demands.

Further, the processor(s) 310 of the UE 302 may receive sensor data directly from onboard sensors, such as the sensor(s) 314, and/or use one or more transceivers 316 for detecting available wireless connections (e.g., Wi-Fi, Bluetooth, cellular, etc.) and for obtaining sensor information from remote sensors. The sensor data component 322 may be configured to determine whether a detected communication link is available by measuring signal strength.

The throughput capability component 324 may include one or more machine-readable instructions configured to calculate an available bandwidth for a wireless connection based on signal strength measurements (e.g., from sensors 314). The throughput or bandwidth capability may also depend on the frequency being used by the communication channel, antenna orientations, interference, packet loss, and other network factors. The throughput capability component 324 may be configured to determine the maximum throughput of a channel based on the measured network factors and conditions. The maximum throughput for one or more channels available to the UE 302 may be provided to the dual channel management component 328 to assist in determining channel requirements.

The data usage component 326 may track the amount of bandwidth used by the UE 302 over time and/or at a specific point in time. The data usage monitoring may include monitoring the PUSCH and PDSCH traffic or monitoring the volume of data packets passing through a transceiver 316 or counting the number of downlink or uplink slots requested by the UE 302. In wireless communications such as 5G, the control traffic of the network may be assigned to separate channels and separate communication slots such as the physical download control channel (PDCCH). The usage of these control channels may correspond to usage of the data channels. The data usage component 326 may monitor and record the total usage including data and control signals. From this bandwidth usage information, the data rate and change of data rate and the rate of change of the change in data rate may be determined. This information regarding data usage may then be stored on electronic storage 312 and shared or read by the dual channel management component 328 to assist in managing the connectivity of the UE 302.

The dual channel (DC) management component 328 of UE 302 may form a two or more connections with communication network 308. The DC management component 328 may negotiate or request network resources from one or more radio networks or network nodes (e.g., 5G) via control messages. The DC management component 328 may manage one or more operations of transceiver 316 including enabling and disabling a DC mode. In DC mode, the transceiver 316 may connect to communications network 308 via dual channels (DC) such as radio links 127$a$,$b$ which may be called a main cell ground (MCG) and a secondary cell group (SCG). When DC mode is disabled then the SCG channel is dropped and only a single channel may be used for uplink and downlink. Therefore, in this disclosure, dropping the SCG channel and disabling or turning off the DC mode may be used interchangeably.

As a non-limiting example, the processor(s) 310 of the computing device 302 may execute the DC management component 328 on the processors, and/or manage one or more transceivers 316 connecting to communication network 308. The processor(s) 310 of the computing device 302 may execute instructions to enable a dual channel connection and instruct the transceiver 316 to connect to the picocell 306 with radio link 127$a$ and connect to gNB 304 with radio link 127$b$ so as to supply a bandwidth required by one or more applications on the UE 302. The DC management component 328 may control the transceiver 316 and the connectivity of the UE 302 according to one or more processes and evaluations described with regard to FIGS. 4A, 4B, 5A, 5B.

Figure 4A:
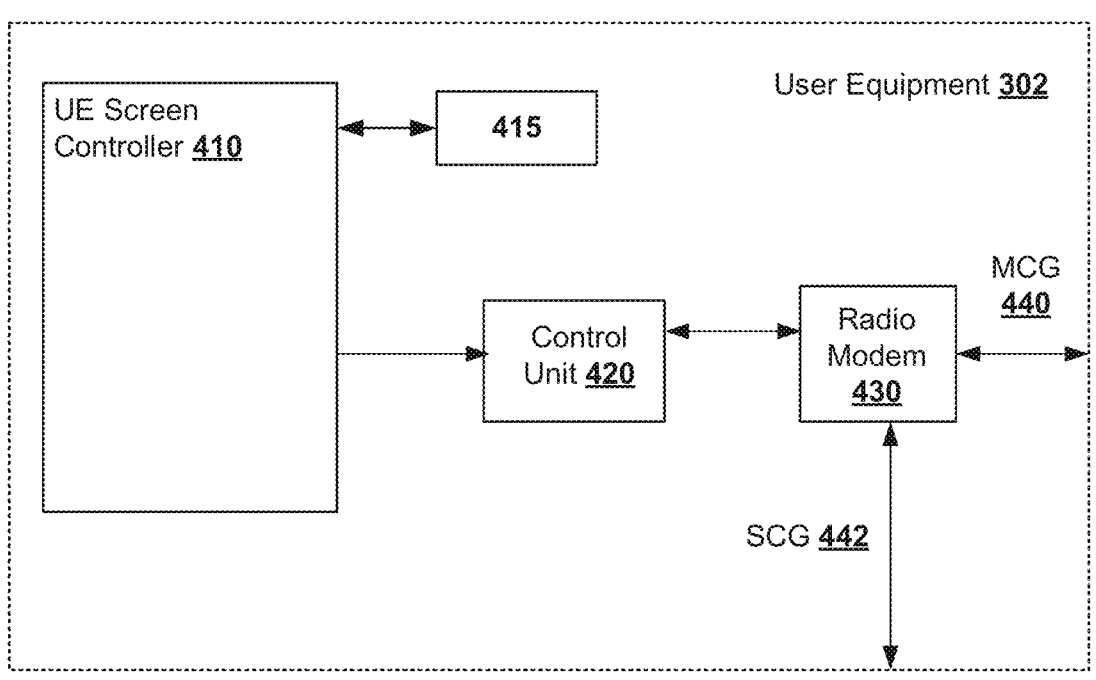
FIG. 4A is a system block diagram illustrating a flow of control signals suitable to implement various aspects herein.

FIG. 4A is a system block diagram illustrating a flow of control signals within a UE 302 (e.g., UE 130) in accordance with various embodiments. With reference to FIGS. 1A-3B, the UE 302 may include a UE screen controller 410, one or more screen sensors 415, a control unit 420 for controlling the wireless communication of the device, and a radio modem 430. The UE screen controller 410 may provide status information and sensor information to the control unit 420 (e.g., processor(s) executing DC management component 328) so that the control unit 420 can better predict the current bandwidth requirements of the UE 302 and the screen thereof. The control unit 420 may communicate with and control the radio modem 430 and may receive information describing the throughput capability of the radio modem 430 and the recent data usage of the UE 302 as handled by the radio modem 430. The radio modem 430 may connect to an external network via MCG 440 and SCG 442 in a DC enabled mode and may connect only via the MCG 440 channel in a DC disabled mode.

The screen sensors 415 may detect a change in the form factor of a UE 302 directly (e.g., by magnetic sensor or capacitance sensor) and/or may monitor one or more actions and parameters at the UE screen controller 410 to identify changes that may affect the bandwidth requirements of the UE 302. The information and conditions detected by the sensors 415 may be relayed via the UE screen controller 410 to the control unit 420 so that the control unit 420 may be informed of changes in the form factor of the UE 302 in real time. Based on the changes in the form factor and measurements from the radio modem 430, the control unit 420 may modify one or more aspects of the connections with the external network (e.g., 127*a,b*). The control unit 420 may be a part of the radio modem 430 and operate as its control circuitry as described below. An example flow of data is illustrated in more detail in FIG. 4B.

Figure 4B:
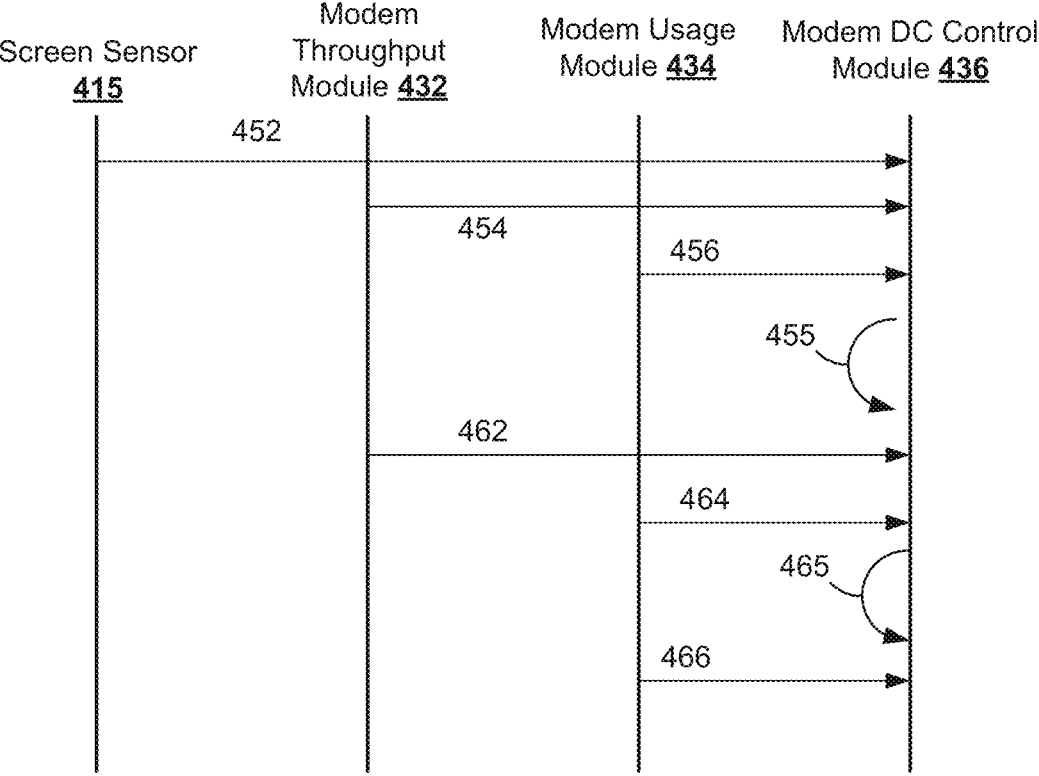
FIG. 4B is a signal diagram illustrating a flow of information suitable to implement various aspects herein.

FIG. 4B is a signal diagram of data flows for DC connectivity control according to some embodiments. With reference to FIGS. 1A-4B, a UE 302/130 may include a screen sensor 415 as described above, a modem throughput module 432 (e.g., throughput capability component 324), a modem usage module 434 (e.g., data usage component 326), and a modem DC control module 436 (e.g., DC management component 328). The modem throughput module 432, a modem usage module 434, and a modem DC control module 436 may be components of the radio modem 430 such that processing of these signals is local to the modem that implements MCG 440 and SCG 442.

As described above, the screen sensor 415 may detect a change in screen output, use, or form factor and transmit a signal to the modem DC control module 436. The sensed change may be transmitted to the modem throughput module 432 and a modem usage module 434 in order to trigger those components of the modem to transmit recent throughput capacity and bandwidth usage information to the modem DC control module 436. The modem throughput module 432 may transmit a signal 454 to the modem DC control module 436 that includes information describing the throughput capacity of one or more channels (e.g., MCG 440/SCG 442). The throughput capacity information of signal 454 may include a threshold or maximum capacity of one or more channels based on the respective channel characteristics (e.g., noise, loss). The modem usage module 434 may transmit data usage information as signal 456 to the modem DC control module 436. The data usage information of signal 456 may include data usage per application, or an average data usage, or a data usage per screen segment (e.g., from the UE screen controller 410).

Based on the form factor data and screen data demands predicted due to the change indicated by signal 452, the modem DC control module 436 (e.g., DC management component 328) may determine at process 455 whether to enable or disable a dual connect (DC) mode of the radio modem 430 (e.g., transceiver 316). The modem DC control module 436 may include a lookup table that indicates the average or maximum data demand of one or more applications for one or more form factors of the UE 302. For example, a UE 302 playing a YOUTUBE video in a web browser application may be associated with a first data demand for a tablet form factor (e.g., UE unfolded 210) and may be associated with a second data demand for a cell phone form factor (e.g., UE 212). Further, a UE 302 streaming audio may be associate an application with the same data demand regardless of the form factor and even if the screen is disabled. The modem DC control module 436 may use the data to predict a change in the needed bandwidth as a result of the form factor change indicated by the screen sensor 415.

The modem DC control module 436 may also use the form factor change as a trigger for calculating a bandwidth requirement based on just signals 454/456. For example, a form factor change detected by screen sensor 415 may trigger modem DC control module 436 to request or check the current throughput capacity and the current data usage rate and compare these values to determine if the capacity is adequate (e.g., if device is unfolded). As another example, a form factor change detected by screen sensor 415 may trigger signals 454/456 to be sent or requested so that the modem DC control module 436 can determine via process 455 if the throughput capacity of a single channel (e.g., MCG 440) is sufficient for the current data usage rate or a predicted data usage rate. Process 455 for determining whether to enable/disable a DC mode of the modem may include comparing a maximum data usage rate or a predefined threshold of data usage with the throughput capacity of one or more channels.

Further, at a predetermined time or periodically, the modem throughput module 432 and the modem usage module 434 may transmit signals 462 and 464 which may contain updated information regarding bandwidth/throughput capacity and data usage, respectively. In process 465, the modem DC control module 436 may re-assess whether or not to disable DC mode. For example, after a form factor change triggers a resolution change in video content in an onscreen application, the image quality and size requests from the UE 302 may be reduced, which may result in delayed reductions in data usage.

The modem DC control module 436 may re-evaluate in process 465 the determination to enable/disable DC mode based on updated data usage information in signal 464 or based on updated throughput capacity information in signal 462 (e.g., higher signal strength). Likewise, the modem DC control module 436 may re-evaluate the determination to enable/disable DC mode based only on updated data usage information in signal 466 (or 464). This evaluation 455 and re-evaluation 465 may be triggered by the detected form factor change such that evaluations of the bandwidth needs of the UE 302 may be delayed by a predetermined time period from the form factor change itself.

FIG. 5A is a process flow diagram illustrating an example process 500 for determining whether to enable/disable DC mode. With reference to FIGS. 1A-5A, the process 500 provides a portion of information flows that begin at 501 in the modem (e.g., 430) of a UE (e.g., 130/302). Process 500 may determine how many channels are needed and what bandwidth resources are required for a UE for a given period of time (e.g., following a form factor change).

In block 502, the UE (e.g., 130, 302) may perform the operations to calculate a maximum throughput for a given wireless configuration of the UE. Means for performing the operations of determination block 502 may include a modem (e.g., 430), transceiver (e.g., 316), or processor(s) (e.g., 602, 604).

In determination block 503, the UE (e.g., 130, 302) may perform operations including determining whether a sensor (e.g., 415) indicates a sub-screen mode is activated. Means for performing the operations of determination block 503 may include a modem (e.g., 430), transceiver (e.g., 316), or processor(s) (e.g., 602, 604).

In response to determining that sub-screen mode is not activated (i.e., determination block 503="No"), the UE may revert to a legacy way (enable SCG-if SCG add function was blocked then unblock it) to enable an SCG channel in block 504. For example, if a form factor has not been reduced, then the process 500 may continue to monitor bandwidth needs according to a legacy process to determine if an SCG channel should be added. Means for performing the operations of block 504 may include a modem (e.g., 430), transceiver (e.g., 316), or processor(s) (e.g., 602, 604).

In response to determining that sub-screen mode is activated (i.e., determination block 503="Yes"), the UE may continue to determination block 505. In determination block 505, the UE may check whether or not it is in a DC mode (i.e., DC mode is enabled) such that dual connections are available or being maintained. Means for performing the operations of determination block 505 may include a modem (e.g., 430), transceiver (e.g., 316), or processor(s) (e.g., 602, 604).

In response to determining that the UE is not in DC mode (i.e., DC mode is disabled) (i.e., determination block 505="No"), the process may continue to block 510 to measure a throughput or a data usage of the UE in a time window. Means for performing the operations of block 510 may include a modem (e.g., 430), transceiver (e.g., 316), or processor(s) (e.g., 602, 604).

To continue on this series of operations, the method 500 may continue from block 510 to determination block 512. In determination block 512, the UE (e.g., 130, 302) may perform operations including determining whether the measured throughput is greater than a second threshold. Means for performing the operations of determination block 512 may include a modem (e.g., 430), transceiver (e.g., 316), or processor(s) (e.g., 602, 604).

In response to determining that the measured throughput is not greater than the second threshold (i.e., determination block 512="No"), the process may return to the starting point at block 501. Means for performing the operations of determination block 512 may include a modem (e.g., 430), transceiver (e.g., 316), or processor(s) (e.g., 602, 604).

In response to determining that the measured throughput is greater than the second threshold (i.e., determination block 512="Yes"), the process may continue to block 504 where an SCG channel may be added via a legacy process (e.g., unblocked). Means for performing the operations of determination block 504 may include a modem (e.g., 430), transceiver (e.g., 316), or processor(s) (e.g., 602, 604).

In response to determining that the UE is in a DC mode (i.e., DC mode enabled) (i.e., determination block 505="Yes"), the method 500 may continue to block 506. In block 506, the throughput or data usage of the UE may be measured within a given time window. As described above, the measurement of the actual throughput of the UE may include an average within a time window, or a total within a time window, or other assessments of data usage within a given time period. Means for performing the operations of block 506 may include a modem (e.g., 430), transceiver (e.g., 316), or processor(s) (e.g., 602, 604).

In block 507, the method 500 may continue from block 506 and may determine whether or not the measured throughput is less than a first threshold. This first threshold may be a point at which continued use of the second channel (e.g., SCG) would waste network resources, or UE power, or both. Means for performing the operations of determination block 507 may include a modem (e.g., 430), transceiver (e.g., 316), or processor(s) (e.g., 602, 604).

In response to determining that the throughput is not less than the first threshold (i.e., determination block 507="No"), the method 500 may revert back to the start at block 501. In this case, then the dual channel (DC) configuration may remain enabled and the method 500 may return to restart the checking process. Means for performing the operations of determination block 507 may include a modem (e.g., 430), transceiver (e.g., 316), or processor(s) (e.g., 602, 604).

In response to determining that the throughput is less than the first threshold (i.e., determination block 507="Yes"), the method 500 may continue to block 508. In block 508, the UE may perform operations to deactivate dual channel (DC) mode and deactivate the second channel (e.g., SCG). In other words, if the data usage or actual throughput is less than a first threshold, the second channel may not be needed and may be deactivated. Means for performing the operations of block 508 may include a modem (e.g., 430), transceiver (e.g., 316), or processor(s) (e.g., 602, 604).

In block 509, the process 500 may continue from block 508 and the UE may perform operations that include blocking the adding of the second channel (SCG). By blocking the reactivation of the SCG channel (i.e., reactivation of the DC mode), the UE executing process 500 may avoid rapid activation and deactivation of the DC mode when actual throughput is close to the first threshold. The blocking of the reactivation of the SCG channel may be periodic, asynchronous, cyclical, for a predetermined time, or a combination thereof. In addition, the second threshold may be less than the first threshold. After the SCG activation is blocked, the process 500 may revert to the start block 501. Means for performing the operations of block 509 may include a modem (e.g., 430), transceiver (e.g., 316), or processor(s) (e.g., 602, 604).

Figures 5B, 5C:
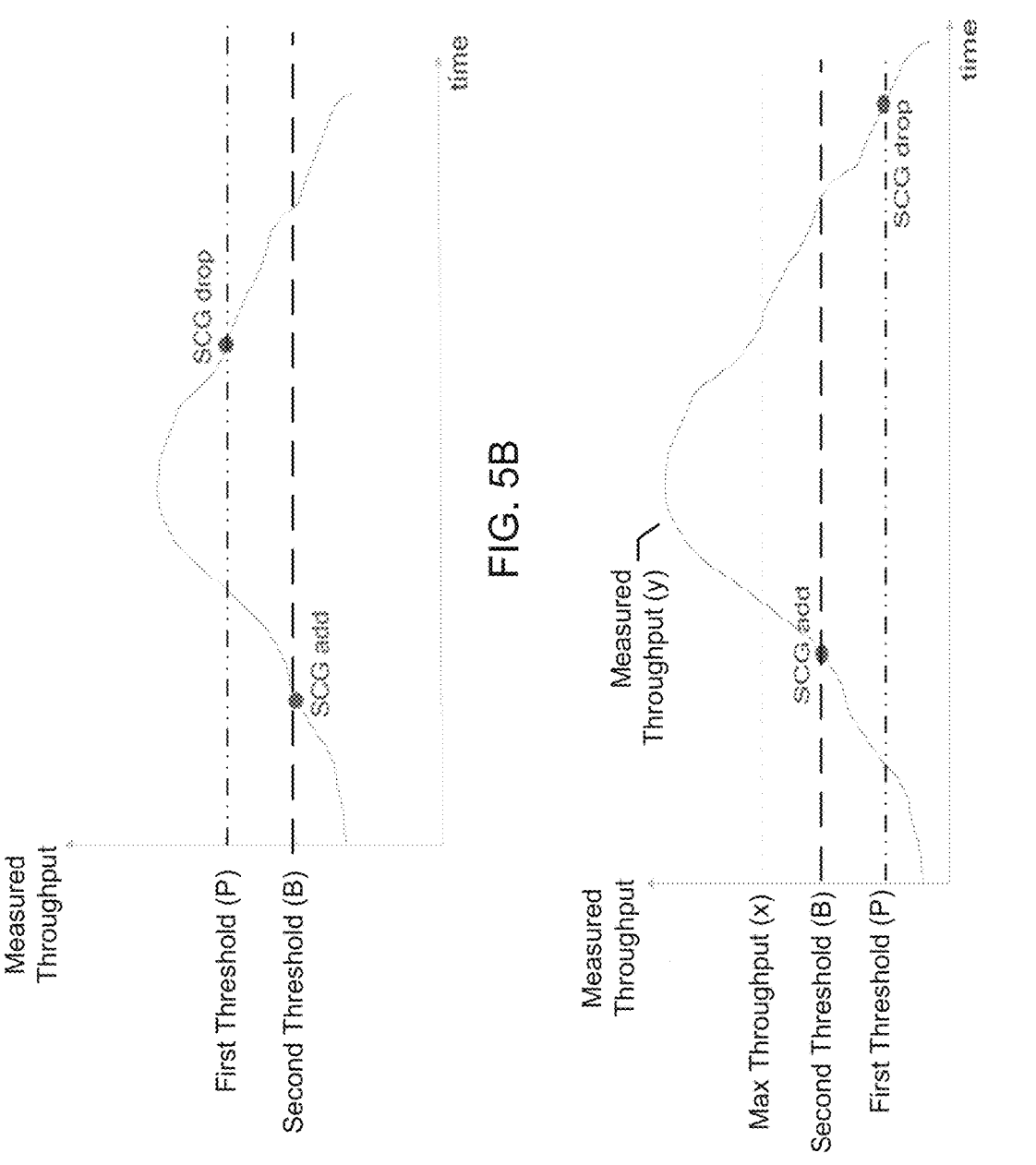
FIG. 5B is a bandwidth usage example illustrating changes made as bandwidth usage changes suitable for implementing various aspects herein.
FIG. 5C is a bandwidth usage example illustrating changes made as bandwidth usage changes suitable for implementing various aspects herein.

FIG. 5B is an example throughput situation illustrating the operation of process 500 as measured throughput changes over time. With reference to FIG. 1A-5B, a UE (e.g., 130, 302) may execute process 500 for activating and deactivating a second channel (SCG) based on changes in actual throughput relative to a first threshold and a second threshold. As the measured throughput (y) increases over time passing above the second threshold (B), the UE may compare the measured throughput (y) and the second threshold (B) to determine an efficient time to add a second channel so as to accommodate the increased throughput required by the UE. As the measured throughput (y) decreases over time passing below the first threshold (P), the UE may compare the measured throughput (y) and the first threshold (P) to determine an efficient time to drop the second channel so as to save power and use radio resources more efficiently.

FIG. 5C is an example throughput situation illustrating the operation of process 500 as measured throughput changes over time. With reference to FIG. 1A-5C, a UE (e.g., 130, 302) may execute process 500 for activating and deactivating a second channel (SCG) based on changes in actual throughput relative to a first threshold and a second threshold. The maximum throughput (x) is illustrated as the top dashed line and may correspond to the maximum throughput of a single channel (i.e., MCG 440). Accordingly, as the measured throughput (y) increases over time passing above the first threshold (P) and reaching the second threshold (B), the UE may compare the measured throughput (y) with the max throughput (x) and the second threshold (B) to determine an efficient time to add a second channel so as to accommodate the increased throughput required by the UE. As described with respect to process 500 of FIG. 5A, the second channel (SCG) may be added to the existing channel (MCG) once the actual throughput as measured is above the second threshold (B) (shown as SCG add).

The second threshold may be arranged below (or at a lower bandwidth measure) than the max throughput (x) of the single channel (MCG) so as to avoid accidentally exceeding the max throughput during the next evaluation cycle. As described above, the max throughput (x) varies not only by the frequency and power of the channel/transmitter, but also due to more transient variables such as noise and interference. Therefore, the second threshold may be advantageously set and may be regularly adjusted to remain below the max throughput (x). In other words, the second threshold may operate as a safety condition to add bandwidth before a channel capacity is reached. Once the SCG channel is added the max throughput of the UE increases, and in this illustration only the single channel max throughput is shown.

As the actual, measured throughput (data usage) decreases from a peak, the usage may drop below the max throughput for a single channel and below the second threshold while remaining in a DC mode with both MCG and SCG channels active. Upon reaching the first threshold and dropping below it, the UE may deactivate DC mode and drop the SCG channel. After the SCG drop, the UE may block the reactivation of DC mode for a given time period. As noted above, the max throughput may change based on a number of variables and the first and second thresholds may also change relative to the max throughput.

Further, the second threshold may be adjusted higher on the bandwidth scale, where shifting the second threshold (and the SCG add point) higher on the bandwidth scale may result in more power savings as DC mode is delayed. The second threshold may be adjusted lower on the bandwidth scale, where such a change may make the user experience and data flows more stable as the SCG channel is added sooner, reducing the chance that the UE reaches the max throughput before the SCG channel can be added.

Further, the first threshold may be adjusted higher on the bandwidth scale, where shifting the first threshold (and the SCG drop point) higher on the bandwidth scale may result in more power savings for the UE. The first threshold may be adjusted lower on the bandwidth scale, where shifting the first threshold (and the SCG drop point) lower on the bandwidth scale may result in more stability since the SCG channel remain active longer.

Figure 6:
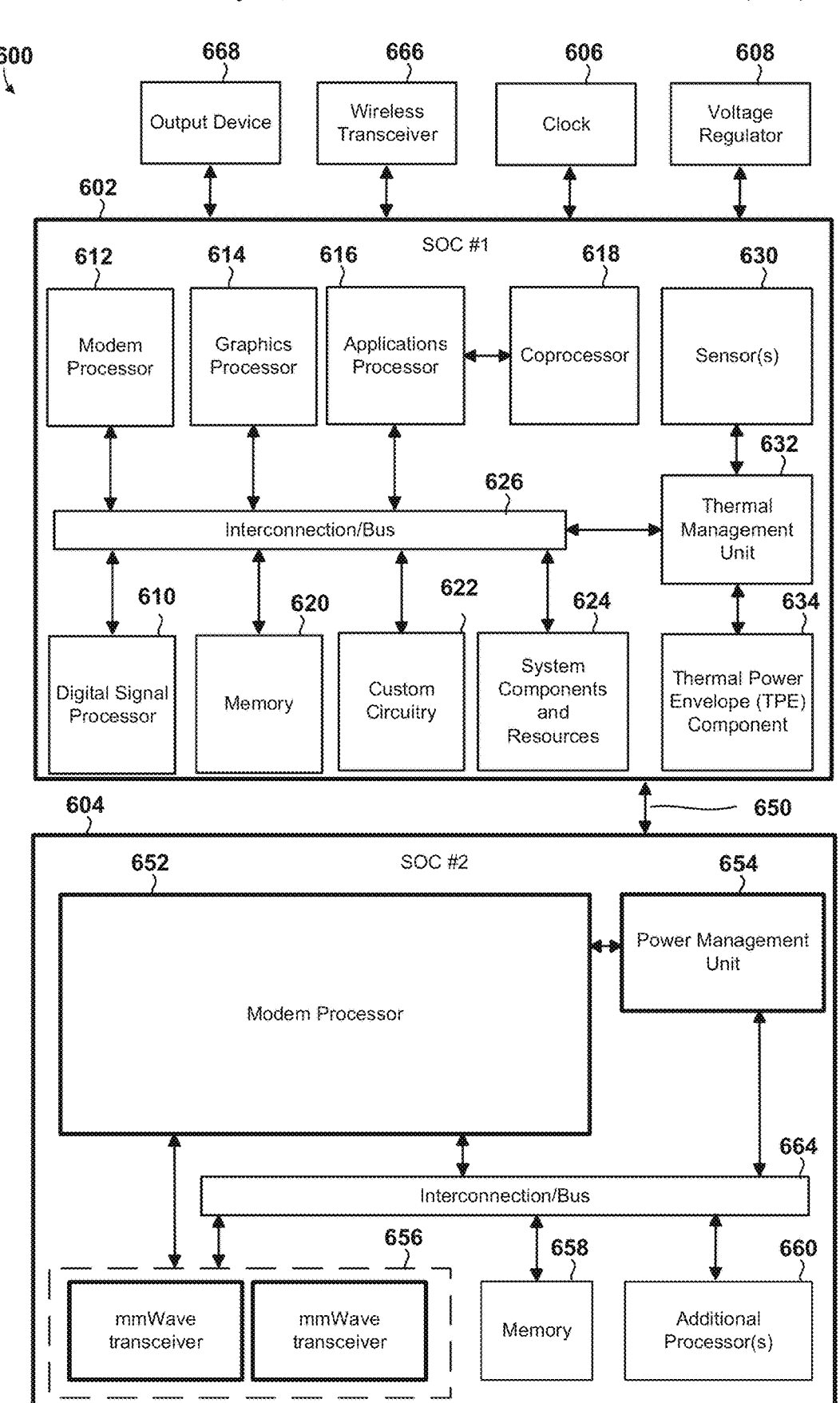
FIG. 6 is a component block diagram of processor systems suitable for use with various aspects herein.

FIG. 6 is a component block diagram illustrating an example computing and wireless modem system 600 suitable for implementing any of the various embodiments. Various embodiments may be implemented on a number of single processor and multiprocessor computer systems, including a system-on-chip (SOC) or system in a package (SIP).

With reference to FIGS. 1A-6, the illustrated example computing system 600 (which may be a SIP in some embodiments) includes a two SOCs 602, 604 coupled to a clock 606, a voltage regulator 608, an output device 668 (e.g., a display), and a wireless transceiver 666 configured to send and receive wireless communications via one or more antennas (not shown) to/from one or more network nodes (e.g., 120). In some implementations, the first SOC 602 may operate as central processing unit (CPU) of a UE (e.g., 130) that carries out the instructions of software application programs by performing the arithmetic, logical, control and input/output (I/O) operations specified by the instructions. In some implementations, the second SOC 604 may operate as a specialized processing unit. For example, the second SOC 604 may operate as a specialized 5G processing unit responsible for managing high volume, high speed (such as 5 Gbps, etc.), and/or very high frequency short wavelength (such as 28 GHz mmWave spectrum, etc.) communications.

The first SOC 602 may include a digital signal processor (DSP) 610, a modem processor 612, a graphics processor 614, an application processor 616, one or more coprocessors 618 (such as vector co-processor) connected to one or more of the processors, memory 620, custom circuitry 622, system components and resources 624, an interconnection/bus module 626, one or more temperature sensors 630, a thermal management unit 632, and a thermal power envelope (TPE) component 634. The thermal management unit 632 and the thermal power envelope (TPE) component 634 may communicate with an edge server 115. The second SOC 604 may include a 5G modem processor 652, a power management unit 654, an interconnection/bus module 664, a plurality of mmWave transceivers 656, memory 658, and various additional processors 660, such as an applications processor, packet processor, etc.

Each processor 610, 612, 614, 616, 618, 652, 660 may include one or more cores and one or more temperature sensors, and each processor/core may perform operations independent of the other processors/cores. For example, the first SOC 602 may include a processor that executes a first type of operating system (such as FreeBSD, LINUX, OS X, etc.) and a processor that executes a second type of operating system (such as MICROSOFT WINDOWS 10). In addition, any or all of the processors 610, 612, 614, 616, 618, 652, 660 may be included as part of a processor cluster architecture (such as a synchronous processor cluster architecture, an asynchronous or heterogeneous processor cluster architecture, etc.).

The first and second SOC 602, 604 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 624 of the first SOC 602 may include power amplifiers, voltage regulators, oscillators, phase-locked loops, peripheral bridges, data controllers, memory controllers, system controllers, access ports, timers, and other similar components used to support the processors and software clients running on an AR device. The system components and resources 624 and/or custom circuitry 622 also may include circuitry to interface with peripheral devices, such as cameras, electronic displays, wireless communication devices, external memory chips, etc.

The first and second SOC 602, 604 may communicate via interconnection/bus module 650. The various processors 610, 612, 614, 616, 618, may be interconnected to one or more memory elements 820, system components and resources 624, and custom circuitry 622, and a thermal management unit 632 via an interconnection/bus module 626. Similarly, the processor 652 may be interconnected to the power management unit 654, the mmWave transceivers 656, memory 658, and various additional processors 660 via the interconnection/bus module 664. The interconnection/bus module 626, 650, 664 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 602, 604 may further include an input/output module (not illustrated) for communicating with resources external to the SOC, such as a clock 606 and a voltage regulator 608. Resources external to the SOC (such as clock 606, voltage regulator 608) may be shared by two or more of the internal SOC processors/cores.

In addition to the example SIP 600 discussed above, some implementations may be implemented in a wide variety of computing systems, which may include a single processor, multiple processors, multicore processors, or any combination thereof.

FIG. 7 is a process flow diagram of an example method 700 that may be performed by a UE having a processing system configured to provide efficient management of network resources and power consumption with a dual channel capability in accordance with various embodiments. With reference to FIGS. 1-7, the method 700 may be performed

| by a UE (e.g., 130, 302) having a processing system (e.g., 600) including at least one processor (e.g., 310, 610, 612, 614, 616, 618), a wireless transceiver (e.g., 430, 666) that may be configured to operate in a dual channel mode. The at least one processor of the processing system may be configured to perform the operations by processor-executable instructions (e.g., 320) stored in a non-transitory processor-readable medium (e.g., memory 620, electronic storage 320). Means for performing the operations of the method 700 may include the UE, a processor, a wireless transceiver, and supporting subsystems and components as described with reference to FIGS. 1-7. To encompass the various configurations of hardware and software that may perform operations of the method 700, the elements performing each operations is referred to as a "processing system."

In block 702, the processing system may determine a maximum throughput based on connection parameters of the user equipment. As noted above, this maximum throughput may vary based on connection parameters (e.g., noise, losses, interference, channel frequency, signal power, etc.). The maximum throughput may be measured or predicted based on one or more measured or selected connection parameters. The maximum throughput may correspond to a bandwidth capability of a single radio channel (e.g., the data slots assigned to a single channel).

In block 704, the UE processing system may receive an indication of a change in a form factor of the user equipment. As described, the UE and/or a modem (or control unit thereof) may receive signals from sensors that detect a folding or a deactivation of a screen of a UE (e.g., activation of a sub-screen). For example, the indication of the change in the form factor may be received from a sensor that detects a screen position. For example, the change in the form factor may be a deactivation of a sub-screen of the user equipment.

In block 706, the processing system may detect an actual throughput of the user equipment within a given time window. As described, the UE may detect an actual throughput or data usage (e.g., data backets transmitted and received) within a given time window or period. This actual throughput may be a measured throughput detected or determined by the modem (e.g., 430) that processes the data flows. These data flows may include the data throughput of the packet data convergence protocol (PDCP) layer within a given time window. The actual throughput may be an average of the data usage of the user equipment within the given time window.

In determination block 708, the processing system may determine whether to enable or disable dual connect for the user equipment based on a comparison of the actual throughput with the maximum throughput. The processing system may determine to disable dual connect if the actual throughput is less than a first threshold and less than the maximum throughput. For example, disabling dual connect may include dropping a secondary cell group (SCG) associated with the user equipment. The comparison of the actual throughput with the maximum throughput in determination block 708 may include a comparison of the actual throughput with a first threshold that is less than the maximum throughput and the comparison of the actual throughput with the maximum throughput may include a comparison of the actual throughput with a second threshold that is greater than the first threshold. A secondary cell group (SCG) may be added via dual connect mode if the actual throughput is greater than the second threshold, and the secondary cell group may be dropped if the actual throughput is less than the first threshold.

In response to determining to disable dual connect (i.e., determination block 708="Disable"), the processing system may disable dual connect in block 710 as described.

In response to the UE not operating in dual connect and determining that dual connect should be enabled (i.e., determination block 708="Enable"), the processing system may enable dual connect in block 712.

Figure 8:
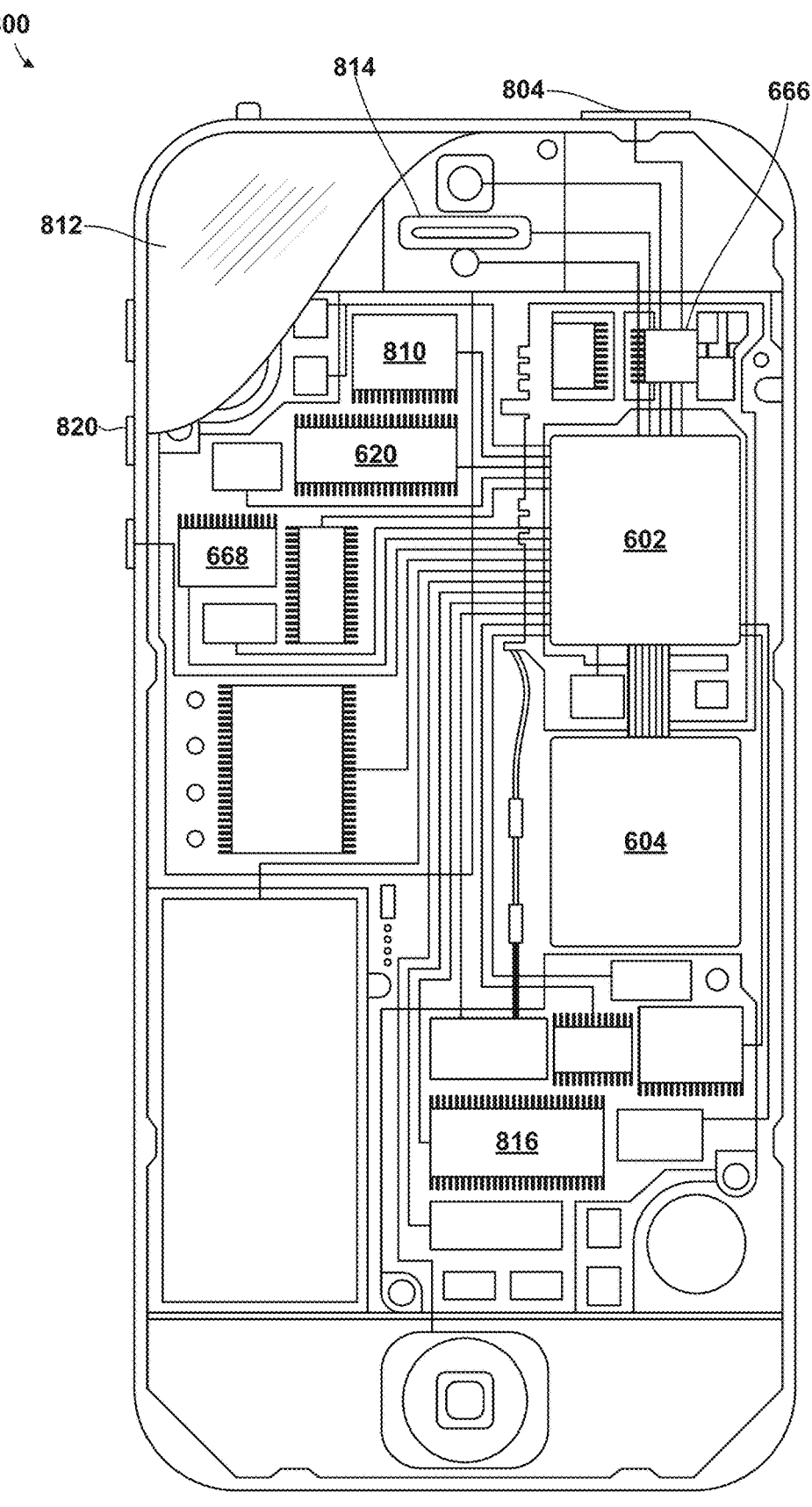
FIG. 8 is a component block diagram of a user device suitable for use with various aspects herein.

FIG. 8 is a component block diagram of a computing device 800 suitable for use with various embodiments. With reference to FIGS. 1-8, various embodiments may be implemented on a variety of computing devices 800 (e.g., UE 130, 302), an example of which is illustrated in FIG. 8 in the form of a smartphone. The computing device 800 may include a first SoC 602 (e.g., a SoC-CPU) coupled to a second SoC 604 (e.g., a 5G capable SoC). The first and second SoCs 602, 604 may be coupled to internal memory 816, a display 812, and to a speaker 814. The first and second SoCs 602, 604 may also be coupled to at least one SIM and/or a SIM interface that may store information supporting dual channel (DC) connections and which support service on a 5G non-standalone (NSA) network.

The computing device 800 may include an antenna 804 for sending and receiving electromagnetic radiation that may be connected to a wireless transceiver 666 coupled to one or more processors in the first and/or second SoCs 602, 604. The computing device 800 may also include menu selection buttons or rocker switches 820 for receiving user inputs.

The computing device 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SoCs 602, 604, wireless transceiver 666 and CODEC 810 may include a digital signal processor (DSP) circuit (not shown separately).

The processors of UE 130, the UE 302, and the computing device 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 604 dedicated to wireless communication functions and one processor within an SoC 602 dedicated to running other applications. Software applications may be stored in memory 620, 816 before they are accessed and loaded into the processor. The processors may include internal memory sufficient to store the application software instructions.

Various implementations illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods 500 and 700 may be performed in an order other than illustrated and described, including in parallel or as a combination of operations.

Implementation examples are described in the following paragraphs. While some of the following implementation examples are described in terms of example methods, further example implementations may include: the example methods discussed in the following paragraphs implemented by a wearable device or an edge server including a processor configured with processor-executable instructions to perform operations of the methods of the following implementation examples; the example methods discussed in the following paragraphs implemented by a wearable device or an edge server including means for performing functions of the methods of the following implementation examples; and the example methods discussed in the following paragraphs may be implemented as a non-transitory processor-readable storage medium having stored thereon processor-executable instructions configured to cause a processor of a wearable device or an edge server to perform operations of the methods of the following implementation examples.

Example 1. A method for power management and bandwidth management of a user equipment, including determining a maximum throughput based on connection parameters of the user equipment; receiving an indication of a change in a form factor of the user equipment; detecting an actual throughput of the user equipment within a given time window; and determining whether to enable or disable dual connect for the user equipment based on a comparison of the actual throughput with the maximum throughput.

Example 2. The method of example 1, in which: the indication of the change in the form factor is received from a sensor that detects a screen position.

Example 3. The method of either of example 1 or 2, in which the change in the form factor is a deactivation of a sub-screen of the user equipment.

Example 4. The method of any of examples 1-3, in which detection of the actual throughput includes detecting a data throughput in a packet data convergence protocol (PDCP) layer within the given time window.

Example 5. The method of any of examples 1-4, the method further including disabling dual connect if actual throughput is less than a first threshold and less than the maximum throughput.

Example 6. The method of any of examples 1-5, in which disabling dual connect includes dropping a secondary cell group (SCG) associated with the user equipment.

Example 7. The method of any of examples 1-6, in which the actual throughput is an average of the data usage of the user equipment within the given time window.

Example 8. The method of any of examples 1-7, further including: comparing the actual throughput with a first threshold that is less than the maximum throughput; comparing the actual throughput with a second threshold that is greater than the first threshold; adding a secondary cell group via dual connect mode if the actual throughput is greater than the second threshold; and dropping a secondary cell group if the actual throughput is less than the first threshold.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA 1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for power management and bandwidth management of a user equipment, comprising:
   determining a maximum throughput based on connection parameters of the user equipment;
   receiving an indication of a change in a form factor of the user equipment;
   detecting an actual throughput of the user equipment within a given time window;
   comparing the actual throughput with a first threshold that is less than the maximum throughput;
   dropping a secondary cell group in response to determining that the actual throughput is less than the first threshold;
   comparing the actual throughput with a second threshold that is greater than the first threshold; and
   adding the secondary cell group via a dual connect mode of the user equipment in response to determining that the actual throughput is greater than the second threshold.

2. The method of claim 1, wherein the indication of the change in the form factor is received from a sensor that detects a screen position.

3. The method of claim 1, wherein the change in the form factor is a deactivation of a sub-screen of the user equipment.

4. The method of claim 1, wherein detection of the actual throughput comprises:
   detecting a data throughput in a packet data convergence protocol (PDCP) layer within the given time window.

5. The method of claim 1, further comprising:
   disabling the dual connect mode if the actual throughput is less than the first threshold and less than the maximum throughput.

6. The method of claim 5, wherein disabling the dual connect mode includes dropping the secondary cell group (SCG) associated with the user equipment.

7. The method of claim 1, wherein the actual throughput is an average of a data usage of the user equipment within the given time window.

8. A user equipment (UE), comprising:
   at least one transceiver configured to establish a dual connect wireless communication link for the user equipment, the at least one transceiver configured to:
   determine a maximum throughput based on connection parameters of the user equipment;
   receive an indication of a change in a form factor of the user equipment;
   detect an actual throughput of the user equipment within a given time window;
   compare the actual throughput with a first threshold that is less than the maximum throughput;
   drop a secondary cell group in response to determining that the actual throughput is less than the first threshold;
   compare the actual throughput with a second threshold that is greater than the first threshold; and
   add the secondary cell group via the dual connect wireless communication link in response to determining that the actual throughput is greater than the second threshold.

9. The UE of claim 8, further comprising:
   a sensor configured to detect a screen position and provide the indication of the change in the form factor to the at least one transceiver.

10. The UE of claim 8, wherein the change in the form factor is a deactivation of a sub-screen of the user equipment.

11. The UE of claim 8, wherein the at least one transceiver is further configured to detect the actual throughput by detecting a data throughput in a packet data convergence protocol (PDCP) layer within the given time window.

12. The UE of claim 8, wherein the at least one transceiver is further configured to:
   disable the dual connect wireless communication link if the actual throughput is less than the first threshold and less than the maximum throughput.

13. The UE of claim 12, wherein the at least one transceiver is further configured to disable the dual connect wireless communication link by dropping the secondary cell group (SCG) associated with the user equipment.

14. The UE of claim 8, wherein the actual throughput is an average of a data usage of the user equipment within the given time window.

15. A non-transitory processor-readable medium having stored thereon processor-executable instructions configured to cause a transceiver of a user equipment to perform operations comprising:

determining a maximum throughput based on connection parameters of the user equipment;

receiving an indication of a change in a form factor of the user equipment;

detecting an actual throughput of the user equipment within a given time window;

comparing the actual throughput with a first threshold that is less than the maximum throughput;

dropping a secondary cell group in response to determining that the actual throughput is less than the first threshold;

comparing the actual throughput with a second threshold that is greater than the first threshold; and adding the secondary cell group via a dual connect mode of the user equipment in response to determining that the actual throughput is greater than the second threshold.

16. The non-transitory processor-readable medium of claim 15, wherein the indication of the change in the form factor is received from a sensor that detects a screen position.

17. The non-transitory processor-readable medium of claim 15, wherein the change in the form factor is a deactivation of a sub-screen of the user equipment.

18. The non-transitory processor-readable medium of claim 15, wherein the stored processor-executable instructions are further configured to detect the actual throughput by detecting a data throughput in a packet data convergence protocol (PDCP) layer within the given time window.

19. The non-transitory processor-readable medium of claim 15, wherein the stored processor-executable instructions are configured to cause the transceiver of the user equipment to perform operations further comprising:

disabling the dual connect mode if the actual throughput is less than the first threshold and less than the maximum throughput.

20. The non-transitory processor-readable medium of claim 19, wherein the stored processor-executable instructions are configured to cause the transceiver of the user equipment to perform operations such that disabling the dual connect mode includes dropping the secondary cell group (SCG) associated with the user equipment.

21. The non-transitory processor-readable medium of claim 15, wherein the actual throughput is an average of a data usage of the user equipment within the given time window.

22. A user equipment, comprising:

means for determining a maximum throughput based on connection parameters of the user equipment;

means for receiving an indication of a change in a form factor of the user equipment;

means for detecting an actual throughput of the user equipment within a given time window;

means for comparing the actual throughput with a first threshold that is less than the maximum throughput;

means for dropping a secondary cell group in response to determining that the actual throughput is less than the first threshold;

means for comparing the actual throughput with a second threshold that is greater than the first threshold; and means for adding the secondary cell group via a dual connect mode of the user equipment in response to determining that the actual throughput is greater than the second threshold.

23. The user equipment of claim 22, further comprising:

means for detecting a screen position; and means for indicating the change in the form factor based on the screen position.

24. The user equipment of claim 22, wherein the means for detecting the actual throughput further comprising:

means for detecting a data throughput in a packet data convergence protocol (PDCP) layer within the given time window.

25. The user equipment of claim 22, further comprising:

means for disabling the dual connect mode if the actual throughput is less than the first threshold and less than the maximum throughput.

26. The user equipment of claim 24, wherein disabling the dual connect mode includes dropping the secondary cell group (SCG) associated with the user equipment.

* * * * *